(12) United States Patent
Meyer

(10) Patent No.: US 7,722,383 B2
(45) Date of Patent: May 25, 2010

(54) RECEIVING ELEMENT FOR FIXING A COMPONENT TO A BRUSH CARRIER

(75) Inventor: Christian Meyer, Karlsruhe-Wolfartsweier (DE)

(73) Assignee: Robert Bosch GmbH, Stuttgart (DE)

( * ) Notice: Subject to any disclaimer, the term of this patent is extended or adjusted under 35 U.S.C. 154(b) by 1061 days.

(21) Appl. No.: 10/495,024

(22) PCT Filed: Mar. 11, 2003

(86) PCT No.: PCT/DE03/00769

§ 371 (c)(1),
(2), (4) Date: May 10, 2004

(87) PCT Pub. No.: WO2004/021545

PCT Pub. Date: Mar. 11, 2004

(65) Prior Publication Data

US 2004/0259409 A1    Dec. 23, 2004

(30) Foreign Application Priority Data

Aug. 28, 2002 (DE) ............................... 102 39 434

(51) Int. Cl.
*H01R 4/24* (2006.01)

(52) U.S. Cl. ............................ 439/404; 310/239; 310/71
(58) Field of Classification Search ................. 439/404; 310/51, 71, 239
See application file for complete search history.

(56) References Cited

U.S. PATENT DOCUMENTS

| 5,563,467 | A  | * | 10/1996 | Csermak et al. ............. 310/239 |
| 5,610,467 | A  |   | 3/1997  | Iverson |
| 5,942,819 | A  | * | 8/1999  | Burgess et al. ................ 310/51 |
| 6,104,110 | A  | * | 8/2000  | Uchida et al. ................. 310/51 |
| 6,198,192 | B1 | * | 3/2001  | Walther ..................... 310/239 |
| 6,201,326 | B1 |   | 3/2001  | Dreier et al. |

FOREIGN PATENT DOCUMENTS

DE    37 30 007 A1    3/1989
EP    0 511 876 A     11/1992

* cited by examiner

*Primary Examiner*—Xuong M Chung-Trans
(74) *Attorney, Agent, or Firm*—Michael J. Striker

(57) ABSTRACT

The present invention relates to a fastening device for fastening a component (4; 15) to a brush carrier (1) for an electrical machine. The fastening device is integral with the brush carrier (1) and has at least one tapered region (7; 25, 26). When installed, the component (4; 15) is located in the tapered region (7; 25, 26).

1 Claim, 4 Drawing Sheets

RECEIVING ELEMENT FOR FIXING A COMPONENT TO A BRUSH CARRIER

BACKGROUND INFORMATION

Figure 1:
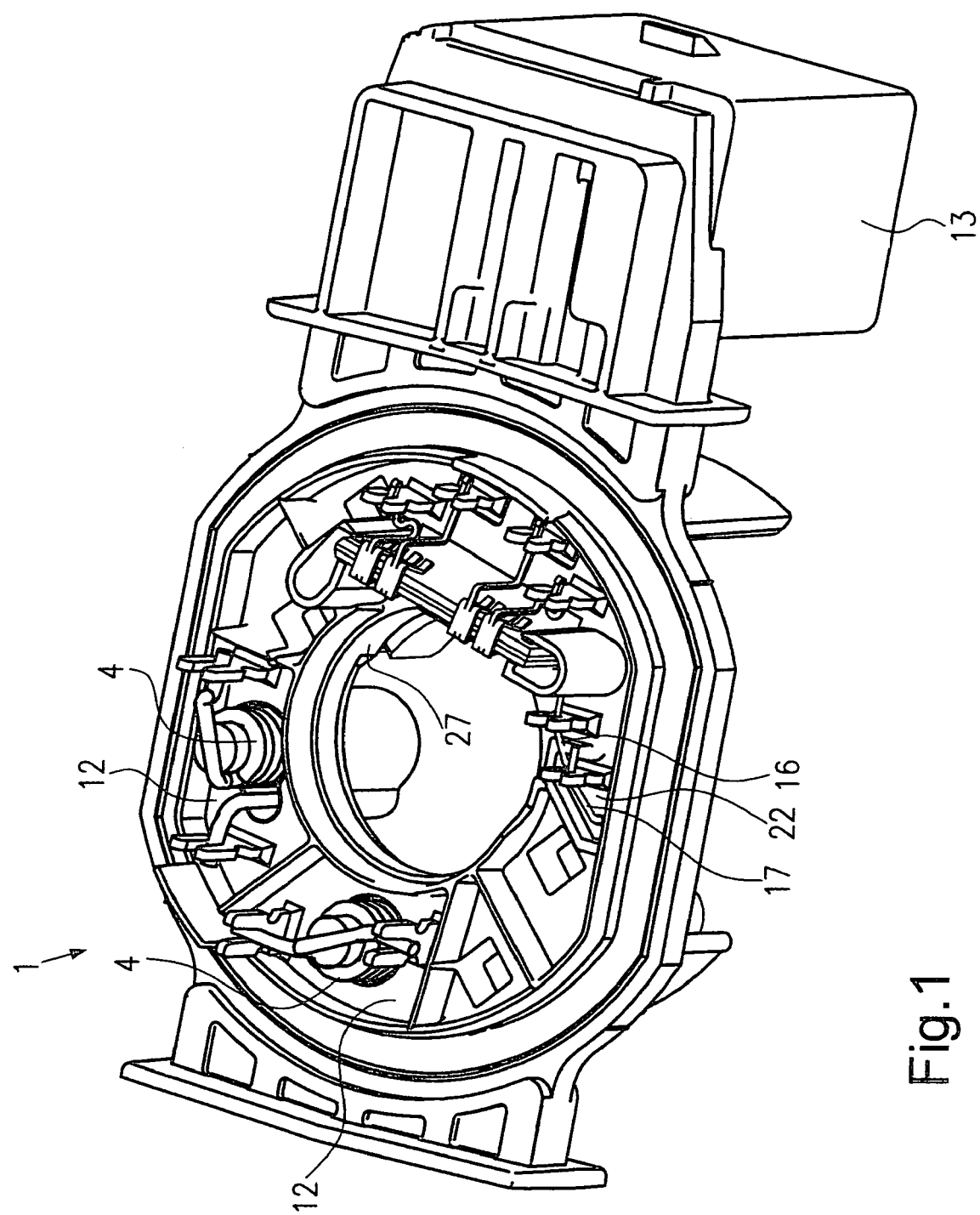

The present invention relates to a fastening device for fastening a component to a brush holder for an electrical machine.

Brush holders are used, e.g., in electrical machines, such as commutator motors or slip-ring motors, to enable an electrical contacting via brushes located on the brush holder. Brush holders often serve to not only fasten brushes, but also to fasten further components of the electrical machine, such as throttles or temperature sensors. When the brush holder is manufactured as an injection-molded part, for example, these components are formed via injection molding in the brush holder, if necessary. It is also known to insert components of this nature onto a brush holder and clip them in place, or to insert components of this nature and join them with the brush holder via hot embossing or hot welding. These known fastening possibilities are very expensive and labor-intensive methods, however. Furthermore, brush holders of this nature having additional components are not suited to increased dynamic loading and/or temperature stressing, because the exposed nature of the fastening of the components to the brush holder can result in these components being easily induced to vibrate.

ADVANTAGES OF THE INVENTION

In contrast, the fastening device, according to the invention, for fastening a component to a brush holder having the features of Claim 1 has the advantage that a component can be fastened to the brush holder easily and economically. Furthermore, the component can be fastened in such a manner that the component cannot be damaged or made to come loose from the brush holder, even when subjected to increased dynamic loading. To this end, according to the invention, the fastening device is integral with the brush holder and has at least one tapered region. When installed, the component to be fastened to the brush holder bears against this tapered region. As a result, it can be ensured that the component is prevented from oscillating. The tapered configuration of the contact region enables compensation for deviations of the component from its geometric deviations that may lie in the tolerance range. In other words, manufacturing-induced dimensional variations of the component are compensated for by the tapered region during installation. In the installed state, the tapered region of the brush holder enables a seat of the component, free from play, in the brush holder, so the component can be prevented from oscillating.

To enable a particularly easy positioning of the component in the brush holder, the tapered region is configured as a tapered, in particular cone-shaped, recess in the brush holder. The recess can be pot-shaped, for example, or configured as tapered through holes.

According to another preferred embodiment of the present invention, the tapered region of the fastening device is configured on at least one raised area that extends out of the brush holder. Particularly preferably, the tapered region is formed on two projecting, raised regions that are diametrically opposed by essentially 180°.

To enable a particularly good fixation of the component to the tapered region of the brush holder, at least one ribbed projection is formed on the tapered region.

To also provide a simple and oscillation-free fastening possibility for electrical terminal connections of the component, preferably substantially U-shaped holding devices are located on the brush holder. The electrical terminal connections that can be a wire or the like, for example, are inserted between the two legs of the U-shaped holding device. It should be noted that the two legs can be positioned parallel to each other or in such a manner that the two legs extend toward each other, so that a tapered receiving area is formed for the terminal connections, i.e., a substantially V-shaped region.

It is further preferred when a lateral hole that extends along the depth of the recess is provided at the region that is configured as a tapered recess. This hole serves to guide an electrical terminal connection of the component upward. As a result, it is possible to fasten components, such as a throttle that has a first connection in the axial direction on one side and a second connection on a diametrically opposed side, to a brush holder in such a manner that the two connections are located on the same side of the brush holder, and no through holes must be provided in the brush holder. This results in the advantage, in particular, that components of this type can be welded on one side of the brush holder to establish an electrical contacting, so that significant reductions in manufacturing costs and manufacturing time are achieved.

According to a particularly preferred exemplary embodiment of the present invention, a casting trough is integral with the brush holder. A casting trough can be provided, e.g., on the brush holder using an integral, circumferential edge. The component to be mounted on the brush holder can be fixed to the brush holder by casting around at least part of the component and/or casting around at least part of the electrical connecting lines of the component in the casting trough. Particularly preferably, according to the invention, the fastening device is located in the casting trough, or the electrical terminal connections of the component are guided through the brush holder and lead into a side in the casting trough that is opposite the mounting location of the component.

The component to be fastened to the brush holder is preferably a throttle or a temperature sensor, in particular an NTC or PTC temperature sensor.

DRAWING

A plurality of exemplary embodiments of the invention are presented in the drawing and are described in greater detail hereinbelow.

Figure 2:
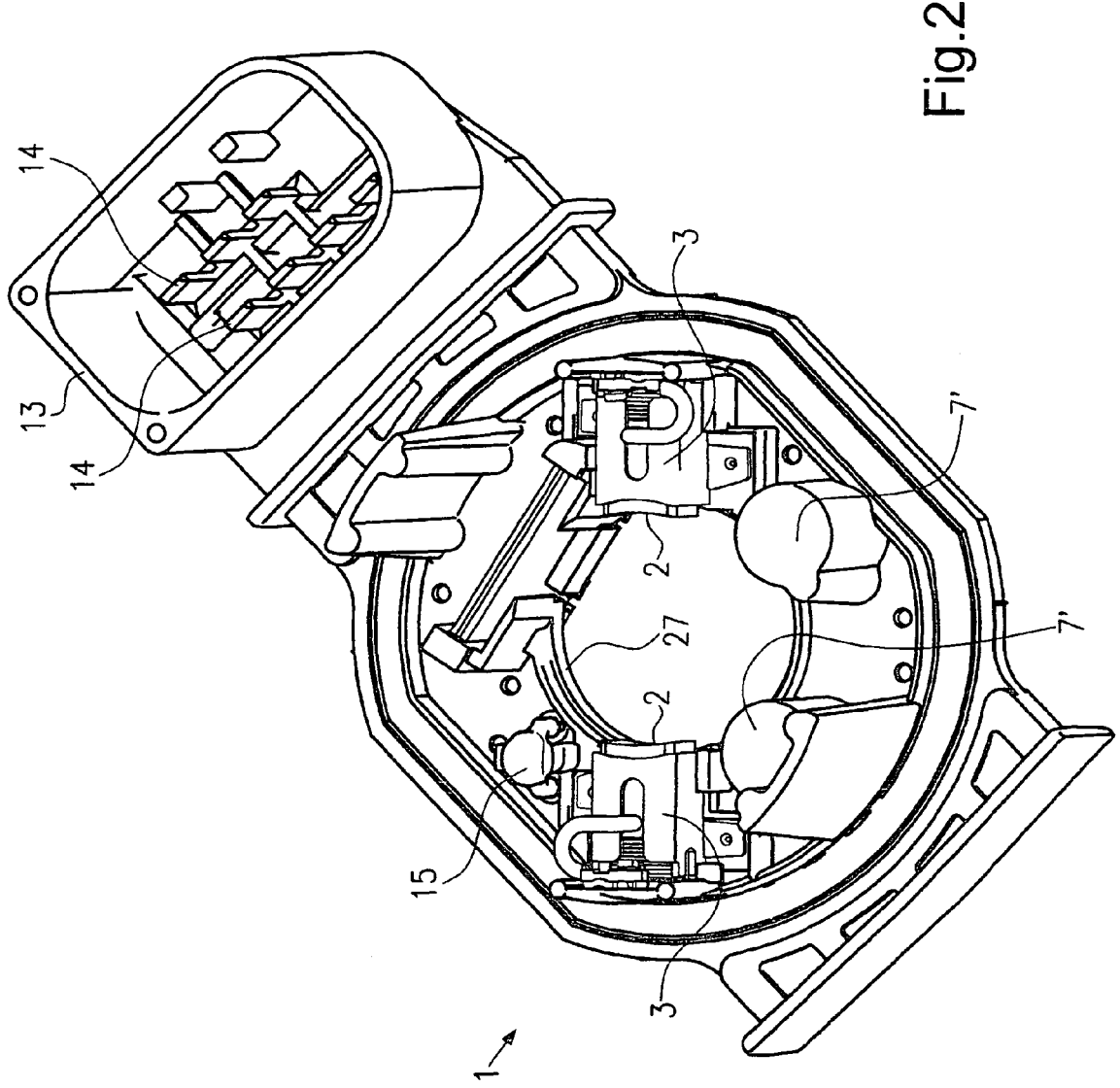
Figure 3:
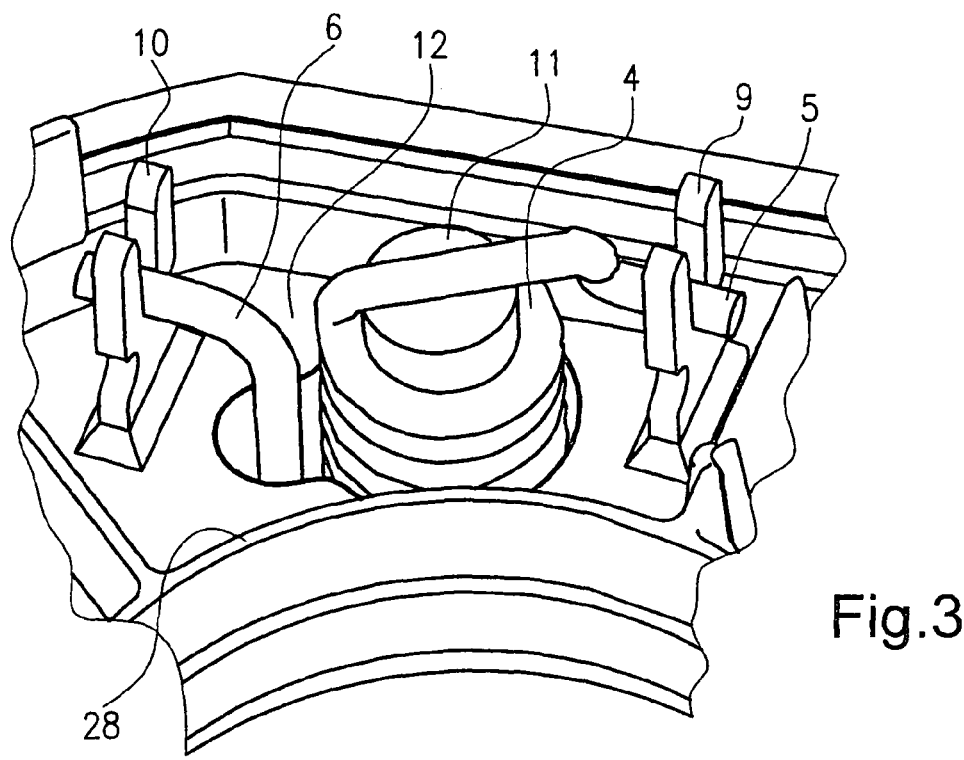
Figure 4:
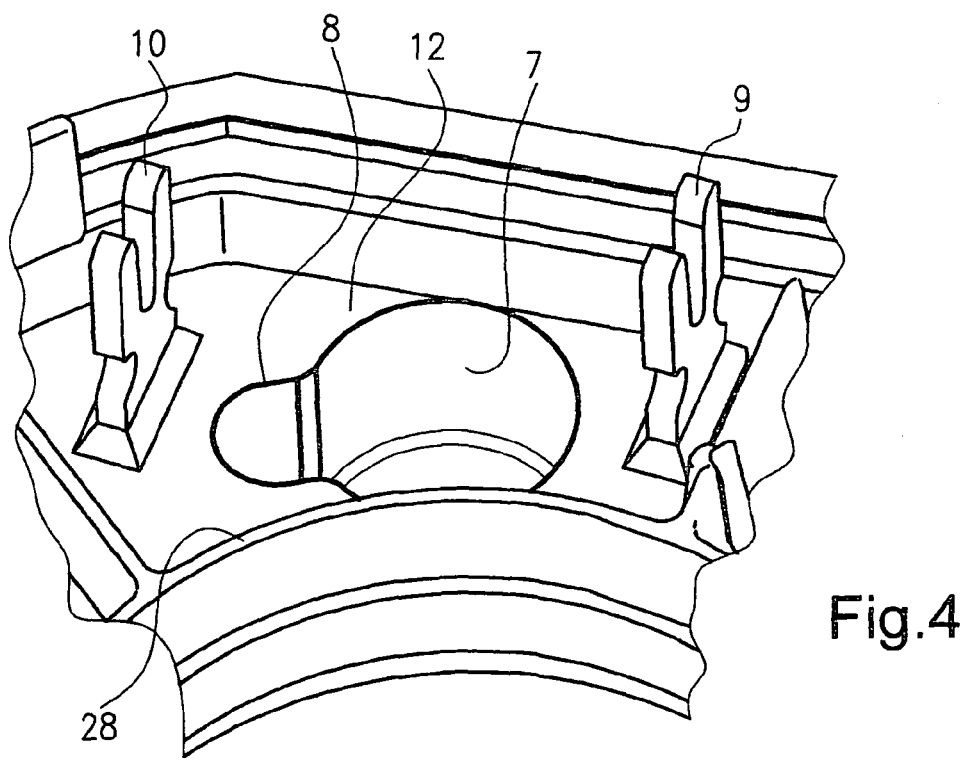
Figure 5:
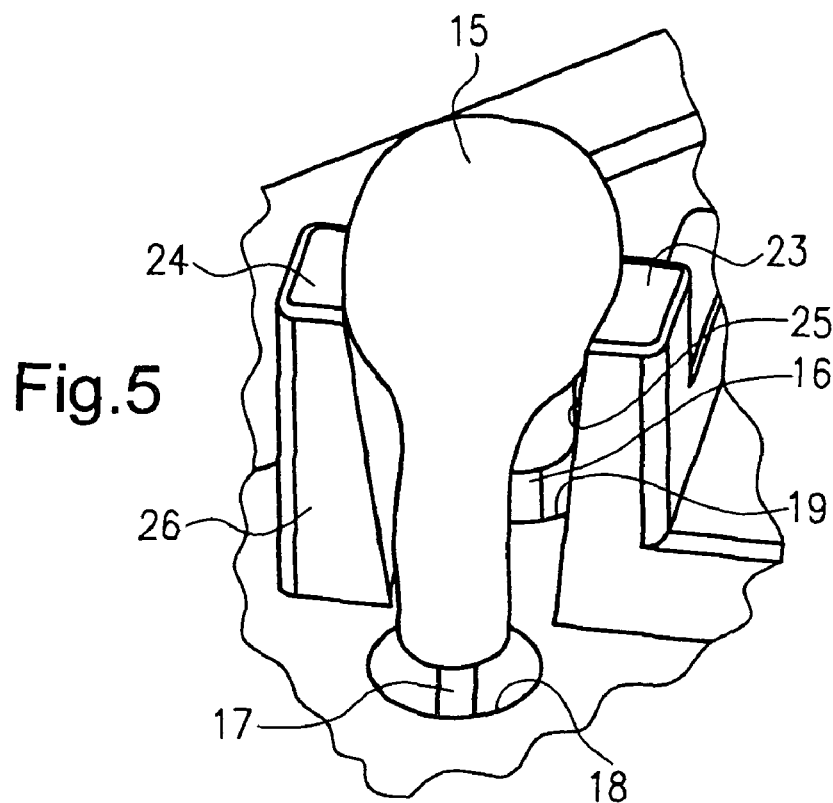
Figure 6:
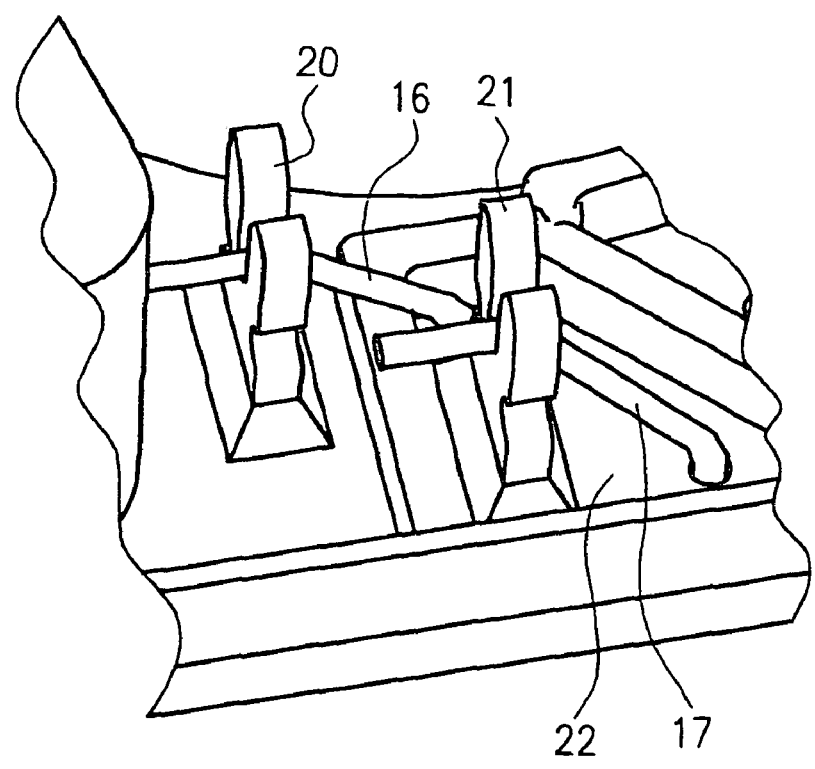

FIG. 1 shows a schematic, perspective view of a brush holder with a fastening device according to a first and a second exemplary embodiment of the present invention, FIG. 2 is a schematic, perspective view of the brush holder from the side opposite to that in FIG. 1, FIG. 3 is a schematic, perspective view of a fastening device with installed component according to a first exemplary embodiment of the present invention, FIG. 4 is a schematic, perspective view of the fastening device in FIG. 3 without the component installed, FIG. 5 is a schematic, perspective view of a fastening device according to a second exemplary embodiment with installed component, and FIG. 6 is a schematic, perspective view of the other side of the brush holder of the component depicted in FIG. 5.

DETAILED DESCRIPTION OF THE EMBODIMENTS

A brush holder 1 is depicted in FIGS. 1 and 2 that has two different fastening devices for fastening various components. The two different components are two throttles 4 and a temperature sensor 15. Brush sensor 1 has a known basic structure in the form of a substantially flat base plate with a center hole 27 and an integral electrical plug connection 13 with a large number of electrical contacts 14. As can be seen in FIG. 2 in particular, two brushes 2 that are diametrically opposed by approximately 180° are located on brush holder 1, each of which is located in a cartridge 3. When brush holder 1 is in the installed state, a rotor shaft is guided through center hole 27, and brushes 2 are in contact with a commutator, for example.

Brush holder 1 is made of an insulating material, such as plastic, for example, and it can be manufactured by injection molding, for example. In addition to the main function of brush carrier 1, namely to hold the brushes, integrally molded fastening devices are also provided, according to the invention, on brush holder 1 for fixing further components to brush holder 1.

A fastening device according to a first exemplary embodiment of the present invention is described hereinbelow with reference to FIGS. 3 and 4, in particular.

As shown in FIG. 3, the component to be fixed to brush holder 1 is a throttle 4. Throttle 4 is composed of a wire wound in the shape of a cylinder, in which a cylindrical iron core 11 is located (refer to FIG. 3). To fix throttle 4 into position, an integral, substantially pot-shaped recess 7 is formed in brush holder 1. Pot-shaped recess 7 is configured in such a manner that it tapers in the direction of the bottom of the pot. This tapering ensures that throttle 4, when installed, comes in contact with the tapered region and is therefore securely positioned on brush holder 1.

In FIG. 2, back side 7' of pot-shaped recess 7 can be seen; it extends out of the flat base plate of brush holder 1.

As can be further seen in FIG. 4, a recess 8 is provided in an edge region of pot-shaped recess 7, the recess 8 extending from the bottom of the pot-shaped recess upward. This recess 8 serves to return a wiring connection 6 of throttle 4 (refer to FIG. 3). As a result of these measures, it is possible for the two wiring connections 5, 6 of throttle 4 to be located on the same side of brush holder 1. By returning wiring connection 6 to the same side of brush holder 1 it is therefore possible for the contacts for throttle 4 to be welded on one side of brush holder 1 and not as in the related art, namely that they must be welded on two different sides of brush holder 1. As a result, considerable manufacturing-related advantages and cost reductions can be achieved.

As shown in FIG. 3, wiring connections 5, 6 of throttle 4 are each positioned in U-shaped holding devices 9, 10. These holding devices 9, 10 serve to hold wiring connections 5, 6 for contacting, and holding devices 9, 10 have a positive effect on the oscillatory behavior of throttle 4 when it is installed. Since throttle 4, in the installed state, bears against the tapered wall section of pot-shaped recess 7, the oscillatory behavior of throttle 4 during operation of the electrical machine can be improved further. Furthermore, this allows adhesive to be applied to wiring connections 5, 6 from one side, so that a fixing into position of wiring connections 5, 6 for subsequent, secure contacting is enabled in simple fashion.

As further shown in FIGS. 3 and 4, the fastening device for fastening throttle 4 is completely surrounded by a circumferential edge 28. A casting trough 12 is thereby formed around the fastening device, so that, after throttle 4 is installed in pot-shaped recess 7 and holding devices 9, 10, installed throttle 4 can be encapsulated in casting trough 12 as the final fixation step. As a result, the resistance of the throttle to oscillation in brush holder 1 can be further improved.

As shown in FIG. 1, four throttles 4 that are located adjacent to each other are provided in the present exemplary embodiment. It should be noted that, due to the arrangement, the edge—shown in FIG. 1—that separates the two casting troughs 12 can also be eliminated, which would enable even faster encapsulation in a larger casting trough in which two fastening devices for the two throttles would be located.

FIGS. 5 and 6 show a fastening device for fastening a component in a brush holder 1 according to a second exemplary embodiment of the invention. As shown in FIG. 5 in particular, the fastening device is formed by two raised areas 23 and 24, which are located such that they are diametrically opposed. The two raised areas 23, 24 are configured on their sides facing each other such that each one has tapered regions 25 and 26. This results in a substantially funnel-shaped intermediate space between raised areas 23, 24, in which the component can be fastened.

As shown in FIG. 5, the component in the second exemplary embodiment is a temperature sensor 15. Temperature sensor 15 has a substantially conical outer shape and includes two wiring connections 16, 17. The temperature sensor itself is located in the conical sheath, which is manufactured, for example, by dipping the temperature sensor in a liquid resin. Temperature sensor 15 is now fastened to brush holder 1 in such a manner that it can be easily clamped between the two tapered regions 25, 26 of raised areas 23, 24. In this manner as well, an oscillatory behavior of temperature sensor 15 that is markedly improved compared to the related art—according to which temperature sensor 15 is fastened in an exposed manner—is made possible.

Furthermore, two through holes 18, 19 are formed in brush holder 1, through which lines 16, 17 of temperature sensor 15 are guided. As a result, the connection of temperature sensor 15 is moved to the opposite side of brush holder 1 (refer to FIG. 1). This measure makes it possible, as shown in FIG. 1, for all points to be contacted on brush holder 1 to be located on one side of brush holder 1, so that a particularly efficient and easily-automatable manufacture of brush holder 1 on components is made possible.

As shown in FIG. 6, the two lines 16, 17 lead into the opposite side and are positioned in holding devices 20, 21 that correspond to holding devices 9, 10 described previously. Lines 16, 17 can also be fixed in these holding devices 20, 21, e.g., via bonding or clamping. Furthermore, the two lines 16, 17 can be subsequently fixed in casting trough 22 by pouring a resin into casting trough 22, as in the first exemplary embodiment. The resistance of temperature sensor 15 to oscillation is further improved as a result.

According to the invention, therefore, an improved dynamic strength of components installed on brush holder 1, such as a throttle 4 and a temperature sensor 15, can be improved by fastening components 4, 15 to tapered regions that are integral with brush holder 1. A further improvement of the dynamic strength of components results from encapsulating the components and/or lines in casting troughs 12 and/or 22 that are integral with brush holder 1. According to the invention, therefore, a movement and/or play of components 4, 15 during operation of the electrical machine can be prevented, so that the electrical machine does not undergo functional failure due to components being damaged by oscillatory stress.

The tapered regions on the brush holder for fastening components further enable less expensive manufacture of components 4, 15, because the tightest fitting tolerances no longer must be selected for these components. Deviations can be compensated for during installation by the tapered regions 7 and/or 25, 26. The tapered regions ensure that there is no play between the component and brush holder 1.

What is claimed is:

1. A fastening device for fastening a component (4; 15) to a brush carrier (1) for an electrical machine, wherein the fastening device has fastening means formed as one piece with the brush carrier (1) and configured as at least one continuous tapered region (7; 25, 26) against which an outer surface of the component (4; 15) bears when installed, wherein, next to the tapered recess (7), an additional recess (8) is formed at the edge of the recess for guiding an electrical terminal connection (5) of the component (4) upward.

* * * * *